US011424998B2

(12) United States Patent
Cohen et al.

(10) Patent No.: US 11,424,998 B2
(45) Date of Patent: Aug. 23, 2022

(54) INFORMATION TECHNOLOGY SERVICE MANAGEMENT RECORDS IN A SERVICE LEVEL TARGET DATABASE TABLE

(71) Applicant: Hewlett-Packard Development Company, L.P., Houston, TX (US)

(72) Inventors: Ben Cohen, Yehud (IL); Einat Atedgi, Yehud (IL); Gil Tzadikevitch, Yehud (IL)

(73) Assignee: Micro Focus LLC, Santa Clara, CA (US)

(*) Notice: Subject to any disclaimer, the term of this patent is extended or adjusted under 35 U.S.C. 154(b) by 1210 days.

(21) Appl. No.: 14/815,307

(22) Filed: Jul. 31, 2015

(65) Prior Publication Data
US 2017/0031943 A1    Feb. 2, 2017

(51) Int. Cl.
*H04L 41/50* (2022.01)
*H04L 41/5009* (2022.01)
*G06F 16/174* (2019.01)
*G06F 3/06* (2006.01)

(52) U.S. Cl.
CPC ........ *H04L 41/5009* (2013.01); *G06F 3/0638* (2013.01); *G06F 16/1744* (2019.01)

(58) Field of Classification Search
USPC ........................................................ 707/693
See application file for complete search history.

(56) References Cited

U.S. PATENT DOCUMENTS

| | | | | |
|---|---|---|---|---|
| 6,662,357 B1* | 12/2003 | Bowman-Amuah | .. | G06Q 10/06 717/120 |
| 7,600,007 B1 | 10/2009 | Lewis | | |
| 8,326,910 B2* | 12/2012 | Bobak | ..................... | G06Q 10/06 709/200 |
| 8,438,117 B2 | 5/2013 | Berthaud et al. | | |
| 8,478,616 B2* | 7/2013 | De Klerk | ............... | G06Q 10/10 705/7.11 |
| 8,589,338 B2* | 11/2013 | Maes | ................... | H04L 67/2838 707/608 |
| 8,914,499 B2 | 12/2014 | Houlihan et al. | | |
| 9,082,093 B2* | 7/2015 | Sharma | ...................... | G06F 8/20 |
| 9,262,731 B1* | 2/2016 | Koushik | ................. | G06Q 10/06 |
| 9,417,917 B1* | 8/2016 | Barber | ................... | G06F 9/5027 |
| 9,524,296 B2* | 12/2016 | Richards | ........... | G06F 17/30008 |
| 9,575,548 B2* | 2/2017 | Masuno | ................ | G06F 9/5088 |
| 9,858,155 B2* | 1/2018 | Ashutosh | .............. | G06F 16/137 |
| 2003/0149702 A1* | 8/2003 | Saffer | ..................... | G06F 16/284 |

(Continued)

OTHER PUBLICATIONS

Lo, D., et al. ITIL—A guide to event management, research paper, Jan. 8, 2014, 5 pages.

*Primary Examiner* — Tamara T Kyle
*Assistant Examiner* — Raheem Hoffler

(57) ABSTRACT

Information technology service management records in a service level target database table may include aggregating, at a predetermined elapsed time, a plurality of actions performed on each of a plurality of ITSM records since a prior update of an SLT database. Service level target tracking may further include identifying a portion of the plurality of aggregated actions that are applicable to an SLT database table entry corresponding to an ITSM record of the plurality of ITSM records. Service level target tracking may also include compressing, in a single operation, the portion of the plurality of aggregated actions.

20 Claims, 4 Drawing Sheets

(56) References Cited

U.S. PATENT DOCUMENTS

| | | | | |
|---|---|---|---|---|
| 2004/0088386 | A1* | 5/2004 | Aggarwal | H04L 41/069 709/220 |
| 2006/0248118 | A1* | 11/2006 | Curtis | H04L 43/0817 |
| 2006/0280161 | A1* | 12/2006 | Liu | H04L 41/0816 370/351 |
| 2008/0021918 | A1 | 1/2008 | Rao | |
| 2008/0222604 | A1* | 9/2008 | Murphy | G06Q 10/06 717/120 |
| 2009/0157441 | A1* | 6/2009 | Curry | G06Q 10/06393 705/7.39 |
| 2009/0187582 | A1* | 7/2009 | Chen | G06F 16/283 |
| 2010/0082620 | A1* | 4/2010 | Jennings, III | G06F 16/285 707/736 |
| 2010/0275054 | A1* | 10/2010 | Grace | G06Q 10/10 714/2 |
| 2011/0167057 | A1* | 7/2011 | Lamm | G06Q 10/10 707/722 |
| 2013/0036091 | A1* | 2/2013 | Provenzano | G06F 17/30162 707/624 |
| 2013/0208880 | A1* | 8/2013 | Lovy | H04L 43/045 379/265.03 |
| 2013/0275085 | A1* | 10/2013 | Cheng | G06Q 10/0639 702/182 |
| 2014/0032525 | A1* | 1/2014 | Merriman | G06F 17/30283 707/713 |
| 2014/0039958 | A1* | 2/2014 | Bivens | G06Q 10/06 705/7.15 |
| 2014/0164323 | A1* | 6/2014 | Park | G06F 16/178 707/611 |
| 2015/0281125 | A1* | 10/2015 | Koponen | H04L 45/745 711/122 |
| 2015/0288557 | A1* | 10/2015 | Gates | G06F 11/3082 714/37 |
| 2016/0036652 | A1* | 2/2016 | Bellini, III | G06F 9/44 709/223 |

* cited by examiner

INFORMATION TECHNOLOGY SERVICE MANAGEMENT RECORDS IN A SERVICE LEVEL TARGET DATABASE TABLE

BACKGROUND

A Service Level Target (SLT) may be a measurable commitment to provide a service. In Information Technology Service Management (ITSM) and ITSM applications (e.g., software applications—directed by policies, organized and structured in processes and supporting procedures—that are performed to deliver, operate, and control IT services offered to customers, etc.), a SLT may be utilized as a metric target achieving or exceeding a commitment that may be defined in a Service Level Agreement (SLA) (e.g., an agreement between an IT service provider and a customer describing the IT service, documenting the SLTs, specifying the responsibilities of the IT service provider and the Customer, defining business goals as they relate to IT services, etc.). The SLTs may be target metrics comparable to SLT metrics of IT service provision (e.g., Key Performance Indicators (KPIs)) in order to determine if an ITSM application design is fit for purpose (e.g., capable of meeting its objectives and service levels).

DETAILED DESCRIPTION

Figure 1:
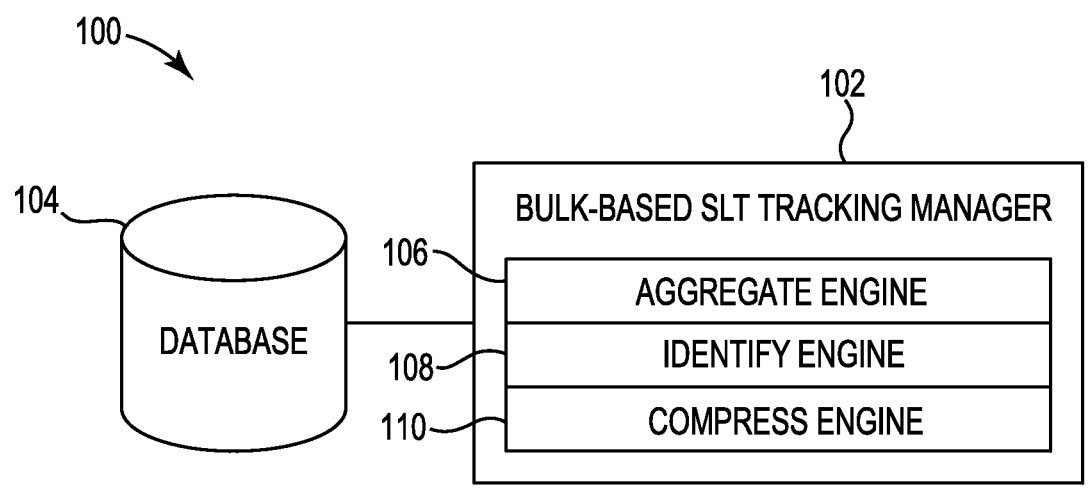
FIG. 1 illustrates a diagram of an example of a system of service level target tracking according to the present disclosure.

An ITSM record may be an electronic record of working on and/or resolving an IT service item. Examples of IT service items may include a request from a customer for an IT service, an IT incident, and/or various other occurrences associated with a demand for IT services and/or service resources. The ITSM record may be referred to as an IT ticket or may be referred to as associated with an IT ticket in the ITSM system. The ITSM record may include a record of an IT event and/or occurrence. The ITSM record may include various attributes of the underlying event and/or occurrence. The ITSM record may include details regarding the ITSM status of the ITSM record. The ITSM record may include details of the assignment and the application of IT service resources to the event and/or occurrence. That is, the ITSM record may include various data associated with identification of, submission of, addressing of, notes regarding, status of, timing of, correspondence associated with, and/or resource requirement tracking of an IT service item and the provision of IT service resources to address and/or solve that item.

In ITSM applications SLT metrics may be utilized to track and/or measure aspects of a response of the IT staff to a variety of ITSM records. The ITSM records may be opened based on actions of an end user. In some examples the ITSM records tracked and/or measured by SLT metrics are IT incidents (e.g., a failure and/or problem with a resource under management of the ITSM application and/or IT staff) and requests (e.g., a particular requests for provision of an IT service related to modification and/or problem resolution of a IT resource under management of the ITSM application and/or IT staff).

An ITSM record may have a lifecycle associated therewith. That is, an ITSM record may be associated with a common series of events and/or occurrences which may happen to the ITSM record or be progressed through by the ITSM record. The lifecycle may include a number of milestone events and/or occurrences. The milestones may be predetermined portions of the ITSM record life-cycle which may be tracked utilizing an SLT tracking mechanism. For example, a milestone may include an initial review milestone. The initial review milestone may define a maximum amount of time that is allowed to elapse before an ITSM Service Desk categorizes and assigns a new incident to an individual or group of ITSM resources for resolution. In another example, the milestone may include a resolution milestone. A resolution milestone may define a maximum amount of time that is allowed to pass before the assigned ITSM resource resolves an ITSM record.

The milestones (e.g., targets) may be defined by properties. That is properties may be combined to constitute a milestone-definition for an ITSM record. The milestone-definition may include a definition of milestone events and/or occurrences that should be achieved in order for the ITSM record to achieve the milestone. Additionally, a target-definition may be assigned to an ITSM record. A target definition may include properties that define various aspects of how the ITSM record will be processed to resolution. In this manner, the target-definition may define the events and/or occurrences that should be achieved in order to achieve the milestone. The properties may be properties of the ITSM record including SLT metrics associated with the ITSM record. The target-definition may define an SLT metric value and/or how the SLT metric is calculated for a particular milestone event and/or occurrence.

Example properties may include target duration and/or elapsed duration parameters. For example, a target duration property may include a definition of a maximum amount of time allotted to supply an ITSM resource and/or a resolution for the ITSM record. In another example, elapsed duration parameters may include definitions which define portions of the ITSM record lifecycle which will start and stop measurement and/or progression of an elapsed duration of time spent working or available for work on the ITSM record. For example, the initial review milestone may start and/or progress an elapsed duration measurement of an ITSM record. In such an example, the ITSM record elapsed duration measurement may be progressed until the record has reached an assignment phase when the record has been assigned to an ITSM resource.

The properties may cumulatively constitute the target definition. A specific ITSM record may be assigned to a specific target definition. The assignment of the ITSM record to a target definition may define a maximum amount of time that is allowed to pass before an ITSM resource should be assigned and/or supplied for work on the ITSM record (e.g., how much time is allowed to pass before a specific ITSM service should be supplied to a submitter of a specific ITSM record). The target definition assignment may be defined according to specific properties of the ITSM record such as the ITSM record priority. An ITSM record priority may include a priority, ranging from high to low priority. An ITSM record that has a high priority may be an ITSM record that is to be answered within a shorter time period (e.g., target duration) that an ITSM record that has a low priority.

Modifying an ITSM record property may cause a target-definition to be changed (e.g., increasing a priority of an ITSM record will decrease the maximum response time of an ITSM resource).

A SLT tracking mechanism may be defined in the granularity of a single SLT entry defined over a single ITSM record. The single SLT entry may be an entry that may include SLT information. The SLT information may include SLT information such as a target date; an elapsed duration, and an SLT status.

SLT tracking mechanisms are based on an event-based calculation. That is, following each action performed over an SLT-supported ITSM record, a calculation is performed to determine the SLT status associated with the ITSM record. The calculation includes querying and updating specific database tables that hold SLT-related history and current SLT status (e.g., achieved, failed, breached, etc.) and/or state (e.g., active, inactive, etc.) of each ITSM record. That is, following each action that is taken over an ITSM record, a calculation is performed, the relevant target state and/or status is updated, the determined information is saved in a dedicated audit record. The audit record may be later used to calculate and/or modify an SLT metric such as elapsed duration and/or make a determination of whether a target elapsed-duration has been reached or breached.

The event-based calculation of SLT tracking mechanisms may be used to determine the correct SLT state. However, the event-based calculation may pose a computational overhead on the ITSM system which grows with the number of ITSM records and/or actions taken over the ITSM records. That is, each calculation imposes a small computation cost on the ITSM system, but considering that such calculations may be performed over a large amount of ITSM records simultaneously, the computational overhead rapidly poses a strain on the ITSM system. The strain on the ITSM system may limit the performance of the ITSM system by limiting the number of SLT-supported records in an ITSM system, which may, in turn, limit the number of customers that an ITSM system can commit to.

In contrast to the SLT tracking mechanism of ITSM systems described above that involve additional computation and memory resources in order to support additional SLT-supported records, examples included herein may decrease computational overhead of SLT calculations by utilizing a bulk-based SLT tracking system over a database. To correctly handle different actions taken within a same time unit without creating an identical computational strain as an event-based SLT tracking mechanism, the bulk-based SLT tracking mechanism described herein may aggregate such actions. For example, the bulk-based SLT tracking mechanism may include aggregating a plurality of actions performed over each of a plurality of ITSM records since a prior update of an SLT database; identifying a portion of the plurality of actions that are applicable to an SLT database table entry corresponding to an ITSM record of the plurality of ITSM records; and compressing the portion of the plurality of aggregated actions.

FIG. 1 illustrates a diagram of an example system 100 for SLT tracking. The system 100 may include a database 104, a bulk-based SLT tracking manager 102, and/or a number of engines (e.g., an aggregate engine 106, identify engine 108, compress engine 110, etc.). The bulk-based SLT tracking manager 102 may include additional or fewer engines than are illustrated to perform the various operations as will be described in further detail.

The number of engines (e.g., an aggregate engine 106, identify engine 108, compress engine 110, etc.) may include a combination of hardware and programming (e.g., instructions executable by the hardware), but at least hardware, that is configured to perform operations described herein (e.g., aggregating, at a predetermined elapsed time, a plurality of actions performed on each of a plurality of ITSM records since a prior update of an SLT database, identifying a portion of the plurality of aggregated actions that are applicable to an SLT database table entry corresponding to an ITSM record of the plurality of ITSM records, compressing, in a single operation, the portion of the plurality of aggregated actions, etc.). The programming may include program instructions (e.g., software, firmware, etc.) stored in a memory resource (e.g., computer readable medium, machine readable medium, etc.) as well as hard-wired program (e.g., logic).

The aggregate engine 106 may include hardware and/or a combination of hardware and programming, but at least hardware to aggregate, at a predetermined elapsed time, a plurality of actions performed on each of a plurality of ITSM records having occurred since a prior update of an SLT database. As used herein, an action performed over an ITSM record may include an action performed by an ITSM resource, such as an IT agent assigned to a particular ITSM record and/or an ITSM computational resource, in the course of resolving an IT service request associated with the particular ITSM record. The actions may be multiple actions that are performed over a single ITSM record during the same time slot. The same time slot may be a period of time corresponding to a predetermined elapsed time. The predetermined elapsed time may be a predetermined amount of time to pass between updates to an SLT database.

An action may include an activity of an ITSM resource performed on an ITSM record which may create or open the ITSM record this may cause creation of an SLT database table entry corresponding to the ITSM record. In an example, the action may include a submission of an IT service request to an ITSM application. The creation of the ITSM record and/or SLT database entry precedes any actions performed over the SLT database entry.

An action may include an activity of an ITSM resource performed on an ITSM record which may start the measurement of an elapsed-duration of the SLT. For example, the action may include an activity such as assigning an ITSM record to a particular ITSM resource for resolution which may start the elapsed-duration of the ITSM record so long as the ITSM resource has concurrent working hours.

An action may include activity of an ITSM resource performed on an ITSM record which may stop work on the ITSM record. The action may include an activity of an ITSM resource performed on an ITSM record which may stop the measurement of an elapsed-duration of the ITSM record. For example, an action may include an activity that resolves (e.g., resolving an IT issue, completing an IT request, completing a series of activities associated with the ITSM record) or closes an ITSM record and/or generates a record of the resolution or closing.

The action may also include activity of an ITSM resource performed on an ITSM record which may suspend progress and/or work toward resolution of the ITSM record. The action may include an activity of an ITSM recourse performed on an ITSM record which may temporarily stop the measurement of an elapsed-duration of the ITSM record. For example, an action may include an activity such as an IT service agent submitting a request for further information from an end user associated with an ITSM record. In an example, the suspending action may include an action by an end user associated with the ITSM record.

The action may include activity of an ITSM resource performed on an ITSM record which may unsuspend and/or resume progress and/or work toward resolution of the ITSM record. For example, the action may include an activity such as receiving a response to a request for further information from an end user associated with an ITSM record. The action may include activity of an ITSM resource which may resume the progression of a measurement of the elapsed duration of the ITSM record.

The action may include activity of an ITSM resource performed on an ITSM record which may restart progress and/or work toward resolution of the ITSM record. For example, the restart action may include an activity such as restarting an ITSM record following a resolution and/or prior closing of the ITSM record upon reemergence of an IT issue underlying the ITSM record. The action may include activity of an ITSM resource which may restart the progression of a measurement of the elapsed-duration of the ITSM record.

The aggregated plurality of actions may be a translation of the actual actions performed on the ITSM record corresponding to an SLT database entry. That is, the actual actions performed over the ITSM record may be translated into an action type/category that characterizes many different actions having the same outcome upon their application. For example, the plurality of actions may be translated into one of a create, a start, a stop, a suspend, an unsuspend, and a restart action type depending on whether application of the action results in creating an SLT entry, initiating measurement of the elapsed-duration, stopping measurement of the elapsed duration and instigating a designation of an SLT status of the SLT database table entry, suspending progression of the elapsed-duration measurement, resuming progression of the elapsed-duration measurement, and restarting measurement of the elapsed duration from a zero time measurement.

The identify engine 108 may include hardware and/or a combination of hardware and programming, but at least hardware to identify a portion of the plurality of aggregated actions that are applicable to an SLT database table entry corresponding to an ITSM record of the plurality of ITSM records. Identifying the portion of the plurality of aggregated actions may include identifying which of the above described actions are performed over each corresponding ITSM record. Additionally, the identify engine 108 may include hardware and/or a combination of hardware and programming, but at least hardware to identify a type associated with each action. Further, the identify engine 108 may include hardware and/or a combination of hardware and programming, but at least hardware to determine those actions of the plurality of actions that are the same type. In some examples, the actions may be identical. However, to be a same type, two actions need not be identical, but rather may be actions that are commonly characterized in the same action type. Examples of action types may include a "create" action type associated with an action that creates an ITSM record, and/or opens IT tickets associated with an IT item; a "start" action type associated with an action that starts the application of IT resources (e.g., work) on the ITSM record and/or initiates a measurement of an elapsed duration of work on the ITSM record; a "stop" action type associated with an action that stops work on the ITSM record, closes an ITSM record, and/or stops the measurement of the elapsed duration of the work on the ITSM record; a "suspend" action type associated with an action that suspends work on the ITSM record and/or suspends measurement of the elapsed duration of work on the ITSM record; an "unsuspend" action type associated with an action that resumes work on the ITSM record and/or resumes measurement of the elapsed duration of work on the ITSM record; and a "restart" action type associated with an action that initializes/reinitializes work on the ITSM record and/or initializes/reinitializes measurement of the elapsed duration of work on the ITSM record restarting the measurement to a beginning point such as time zero.

An example of an action associated with a "create" action type may include the submission of a request for IT assistance from an end user that causes an ITSM record to be generated associated with that request. An example of an action associated with a "start" action type may include the assignment of an IT resource, such as an IT service agent, to the above mentioned example request for IT assistance. An example of an action associated with a "suspend" action type may include the assigned IT service agent noting that further information is necessary to process the above mentioned example request and/or sending correspondence to the end user requesting that information. An example of an action associated with an "unsuspend" action type may include receiving a reply from an end user to a request for further information. An example of an action associated with a "stop" action type may include receiving an indication from an IT service agent and/or the end user that the above mentioned request for IT assistance has been satisfied and the underlying IT event has been resolved. An example of an action associated with a "restart" action type may include an indication that the IT event underlying the above mentioned request for IT assistance has reemerged and/or the resolution was incomplete causing the ITSM record to be reopened.

The identify engine 108 may include hardware and/or a combination of hardware and programming, but at least hardware to translate actions to the above described action types. For example, the actions may be analyzed and their characteristics and or resulting outcomes may be determined and matched to an action type.

The identify engine 108 may include hardware and/or a combination of hardware and programming, but at least hardware to translate actions to aggregate actions of a specific type into a single operation or an instruction for a single operation. For example, all actions performed over a plurality of ITSM records since a previous update of the single SLT database in which the corresponding SLT database entries are housed and/or since a predetermined elapsed amount of time since the last update (e.g., one minute, etc.) may be aggregated into action types to be applied as an update to the corresponding SLT database entries in a bulk operation (e.g., a single structured query language (SQL) operation over the SLT database entries).

Multiple actions (e.g., start, suspend, unsuspend, suspend, unsuspend, stop, etc.) may occur over the same ITSM record in the period of time intervening between SLT database table updates. The identify engine 108 may include hardware and/or a combination of hardware and programming, but at least hardware to identify a portion of the aggregated actions that are actions performed over the same ITSM record corresponding to the same SLT database table entry (e.g., actions that are applicable to a same database table entry). This may include identifying the portion of aggregated actions applicable to the same SLT database entry corresponding to the same ITSM record, which occurred over the same time period. That is, the aggregated actions that are performed over a same ITSM record over a same time period corresponding to a predetermined elapsed period of time between updates may be identified.

The compress engine 110 may include hardware and/or a combination of hardware and programming, but at least hardware to compress, in a single operation, the portion of the plurality of aggregated actions. The compression mechanism may be utilized to handle different actions over the same target occurring in the same predetermined elapsed period of time (e.g., a start type action, a suspend type action, an unsuspend type action all occurring to the same ITSM record SLT database entry over the same 1 minute that has elapsed since the prior update).

In order to correctly handle multiple actions that are taken over the same ITSM record in the same time unit, a state machine may be defined. The state machine may process the actions. Every SLT state may be equivalent to an SQL operation that will be taken upon corresponding rows in the SLT database state table. Transitions between states may be defined by taken actions. Some of the states may represent a compression over actions. For example, multiple actions may be compressed into a single SQL operation while keeping the correct SLT state and progressing it accurately. Compressing the portion of the plurality of aggregated actions may include only updating the SLT database state table once according to the SLT state.

For example, the following action types were performed over an ITSM record: start, suspend, unsuspend. After performing those operations the SLT state should be unsuspended (Active) so the start and suspend actions did not affect the SLT database table entry other than for an elapsed-duration calculation. Therefore, those three actions may be compressed into one action which will set the SLT state to be active and will progress the elapsed duration accordingly.

The single SLT database utilized in the system 100 for bulk-based SLT tracking may include a single database table that may store the SLT state of a plurality of SLT database entries defined over corresponding ITSM records. The SLT state of a database entry and/or a corresponding ITSM record may include a designation of whether the ITSM record is active or inactive. An active ITSM record may be one that is currently being worked on. An active ITSM record may be one that has had work on it started, has had work unsuspended on it, and/or has had work restarted on it and is not currently stopped or suspended. An active ITSM record may be one where an elapsed-duration measurement of time spent working on resolving the ITSM record actively progressing.

Conversely, an inactive ITSM record may be one that is not currently being worked on and/or is stopped or closed. An inactive ITSM record may be one that has had work on it suspended and/or stopped and is not currently started, restarted, or unsuspended. An inactive ITSM record may be one where an elapsed-duration measurement of time spent working on resolving the ITSM record is halted and/or not being actively progressed.

Performance of the operations described herein (e.g., aggregating a plurality of actions performed over each of a plurality of ITSM records since a prior update, identifying a portion of the plurality of aggregated actions that are applicable to an SLT database entry corresponding to an ITSM record of the plurality of ITSM records, compressing, in a single operation, a portion of the plurality of aggregated actions, etc.) may include performing the operations and associated calculations directly over the single database table in a bulk operation (e.g., all actions from each action type in a single SQL operation).

The single SLT database table may additionally include a comprehensive set of values for each single SLT database entry. For example, the SLT database table may include a comprehensive representation of the SLT information associated with an ITSM record corresponding to the SLT database entry. The SLT database may include any measurements and/or other metrics associated with the SLT information for each SLT database entry. For example, the SLT database may include a target date, an elapsed duration, and/or an SLT status for each SLT database entry.

As used herein, a target date may include the time (estimated date, hour, minute, second, etc. of completion) by which a target (e.g., resolution of an ITSM record) should be achieved according to a commitment (e.g., SLA, etc.). The date may be calculated according to a target-duration (e.g., a total amount of time allotted to resolution of an ITSM record corresponding to an SLT database entry according to an SLA, etc.) in combination with a working-schedule of assigned ITSM resources (e.g., computational resources, IT service agents, etc.).

As used herein, an elapsed-duration may include how much time has already been spent working on the ITSM record corresponding to the SLT database entry. The elapsed-duration may include a measurement of the amount of time that has actually been spent working on the ITSM record as opposed to simply the time elapsed since it was opened. The elapsed-duration measurement may be limited to those instances where the ITSM record was active and not suspended or stopped. The elapsed-duration for a given SLT database entry may be calculated according to the target-duration, the working-schedule, and-or the SLT status associated with that SLT database entry.

As used herein, an SLT status may include a status that is associated with an ITSM record and/or a corresponding SLT database entry. The status may include a designation of whether the ITSM record is active. An ITSM record may be active when it has been created and/or assigned to an IT service agent and is currently open and being worked on. The ITSM record may be considered active prior to the ITSM record being closed and/or an action being taken over the ITSM record which is a "stop" action type that resolves the underlying IT item and closing the ITSM record.

The status may include a designation of whether the ITSM record is breached. An ITSM record may be breached when the ITSM record is currently open and being worked on, but the elapsed duration has already exceeded the target-duration and/or a time specified in a commitment such as an SLA limiting the maximum amount of time that may be spent on the ITSM record before the milestone should be achieved.

The status may include a designation of whether the ITSM record is achieved. An ITSM record may be achieved when the ITSM record is resolved and/or closed while its elapsed duration is within the target-duration and/or a time specified in a commitment such as an SLA limiting the maximum amount of time that may be spent on the ITSM record before the resolution should occur.

The status may include a designation of whether the ITSM record is failed. An ITSM record may be failed when a milestone (e.g., initial review, assignment to an IT service agent, a percent of an allotted duration of time to work on the ITSM record having elapsed, a percentage of completion of an ITSM record, resolution of the ITSM record, etc.) wasn't reached within a defined target-duration according to a defined working schedule. An ITSM record may be failed when the milestone wasn't reached within a defined target-duration and the ITSM record is closed and/or work is no longer being performed on it.

The compress engine 110 may include hardware and/or a combination of hardware and programming, but at least hardware, to apply the aggregated plurality of actions to the SLT database table in a bulk operation. Applying the aggregated actions may include performing an action such as a calculation over an SLT database entry and/or performing an alteration of the SLT database entry to reflect the consequence of the actions being applied. Applying the aggregated plurality of actions may include performing each of a plurality of aggregated actions of a specific type in a single operation. For example, applying the aggregated plurality of actions may include altering the SLT state of a number of different SLT database entries corresponding to ITSM records based on a corresponding applied action. In an example, an ITSM record having an unsuspend action type performed over it since the prior update may result in a change to a corresponding SLT state associated with an SLT database entry to reflect a change to an active SLT state. Modifying an SLT state of multiple SLT database entries corresponding to multiple distinct ITSM records may be performed in a bulk operation such as in a single SQL operation performed directly over the SLT database entries.

The compress engine 110 may include hardware and/or a combination of hardware and programming, but at least hardware, to update, at a predetermined elapsed time, each of the plurality of ITSM records in the SLT database table. In contrast to prior action based methods of updating ITSM records, examples herein include updating the SLT database table entries corresponding to ITSM records at a predetermined elapsed time. That is, the update may occur at a predetermined frequency and may be based on time that has elapsed since the last update. In one example, the SLT database table entries may be updated every minute.

Updating each of the plurality of ITSM records may include modifying the SLT database entry included in the SLT database table that corresponds to each of the plurality of ITSM records. Specifically, updating each of the plurality of ITSM records may include updating SLT information associated with each SLT database entry.

For example, updating each of the plurality of ITSM records may include updating an elapsed-duration of each of the plurality of ITSM records in a single operation. An elapsed-duration may include a measurement of an amount of time that has elapsed while the ITSM record has been active. Additionally, an elapsed-duration may an amount of time that has elapsed when the ITSM record has been created and is active and could be worked on according to a working schedule of the availability an ITSM resource to which it is assigned. In this manner, the elapsed-duration may exclude from its measurement, elapsed time during which an assigned IT resource is unavailable, elapsed time during which the ITSM record has not yet been created, and/or elapsed time during which the ITSM record has an inactive SLT state (e.g., periods during which a "stop" or "suspend" action type is performed over the ITSM record).

Updating the elapsed-duration of each of the plurality of ITSM records in the single operation may include progressing a measurement of elapsed time for each of the plurality of ITSM records by an amount of time since the prior update during which the record had an active SLT status. Further, the elapsed-duration progression may be limited to the portion of the time elapsed since a previous update of the SLT database during which the SLT status of the SLT database entry corresponding to the ITSM record is active and when an IT resource to which the ITSM record is assigned is available to work on the ITSM record (e.g., according to a working schedule).

In another example, updating each of the plurality of ITSM records may include determining an updated SLT status of each of the plurality of ITSM records. Determining an updated SLT status may be based on comparing a corresponding updated elapsed-duration and a target-duration for each of the plurality of ITSM records. For example, an SLT status may be determined by examining whether the elapsed-duration measured for an ITSM record is within the target-duration for the ITSM record. In an example, if an elapsed-duration measurement of the ITSM record activity is within a target duration and the ITSM SLT state is active, then the SLT status may be updated to active. In another example, if an elapsed-duration measurement of the ITSM record activity is within a target duration and the ITSM SLT state is inactive (e.g., as a result of a stop action type being performed over the ITSM record), then the SLT status may be updated to achieved. In an example, if an elapsed-duration measurement of the ITSM record activity is outside of a target-duration and the ITSM SLT state is inactive (e.g., as a result of a stop action type being performed over the ITSM record), then the SLT status may be updated to failed. In an example, if an elapsed-duration measurement of the ITSM record activity is outside of a target-duration and the ITSM SLT state is active, then the SLT status may be updated to breached.

Updating, in a single operation, each of the plurality of ITSM records may further include modifying the target-date associated with an SLT database entry included in the SLT database table that corresponds to each of the plurality of ITSM records. The target-date may include a targeted point of time for completion of resolution of the ITSM record. The target-date may be based on the elapsed-duration of activity on the ITSM record, the working schedule of ITSM resources to which the ITSM record is assigned, and/or the target-duration terms specified in an SLA. Updating the target-date may include modifying the target-date based on changes to the elapsed duration, the working schedule, and a target duration specified in an SLA occurring since a prior update of the SLT database table.

Figure 2:
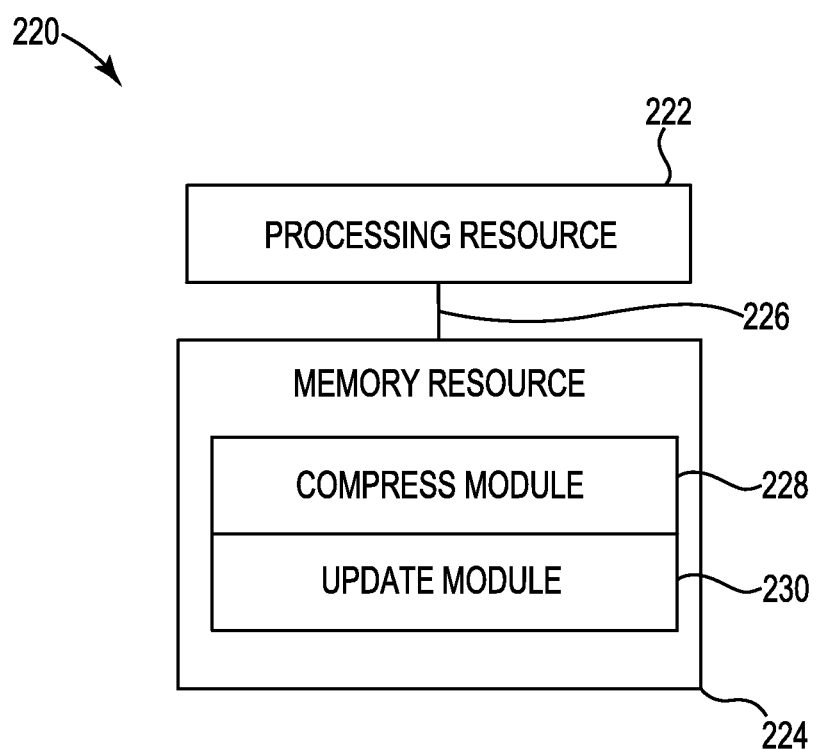
FIG. 2 illustrates a diagram of an example of a computing device according to the present disclosure.

FIG. 2 illustrates a diagram of an example of a computing device 220 according to the present disclosure. The computing device 220 may utilize software, hardware, firmware, and/or logic to perform operations described herein.

The computing device 220 may be any combination of hardware and program instructions to share information. The hardware, for example, may include a processing resource 222 and/or a memory resource 224 (e.g., non-transitory computer-readable medium (CRM), machine readable medium (MRM), database, etc.). A processing resource 222, as used herein, may include any number of processors capable of executing instructions stored by a memory resource 224. Processing resource 222 may be implemented in a single device or distributed across multiple devices. The program instructions (e.g., computer readable instructions (CRI)) may include instructions stored on the memory resource 224 and executable by the processing resource 222 to implement a desired operation (e.g., compress, in a single operation at a predetermined elapsed time, a portion of a plurality of aggregated actions performed on each of a plurality of ITSM records in a SLT database table since a prior update of the SLT database table, wherein the portion is applicable to an ITSM record of the plurality of ITSM records, update, in a single operation at the predetermined elapsed time, SLT information if each of the plurality of ITSM records based on the compressed actions, etc.)

The memory resource 224 may be in communication with the processing resource 222 via a communication link (e.g., a path) 226. The communication link 226 may be local or remote to a machine (e.g., a computing device) associated with the processing resource 222. Examples of a local communication link 226 may include an electronic bus internal to a machine (e.g., a computing device) where the memory resource 224 is one of volatile, non-volatile, fixed, and/or removable storage medium in communication with the processing resource 222 via the electronic bus.

A number of modules (e.g., compress module 228, update module 230, etc.) may include CRI that when executed by the processing resources may perform operations. The number of modules (e.g. compress module 228, update module 230, etc.) may be sub-modules of other modules. For example, the compress module 228 and update module 230 may be sub-modules and/or contained within the same computing device. In another example, the number of modules (e.g., compress module 228, update module 230, etc.) may comprise individual modules at separate and distinct locations (e.g., CRM, etc.).

Each of the number of modules (e.g., compress module 228, update module 230, etc.) may include instructions that when executed by the processing resource 222 may function as a corresponding engine as described herein. For example, the compress module 228, and update module 230 may include instructions that when executed by the processing resource 222 may function as the compress engine 110.

The compress module 228 may include CRI that when executed by the processing resource 222 may compress, in a single operation at a predetermined elapsed time, a portion of a plurality of aggregated actions performed on each of a plurality of ITSM records in a SLT database table since a prior update of the SLT database table, wherein the portion is applicable to an ITSM record of the plurality of ITSM records. Actions performed over an ITSM record may modify SLT information in a corresponding SLT database table entry. The performed actions may modify the SLT state, target date, elapsed-duration, status, etc. Multiple actions may be performed over the same ITSM record in the same time unit, where the time unit may be a predetermined elapsed duration corresponding to a period of time intervening between updates of the SLT database table occurring at a predetermined frequency.

Compressing a portion of the plurality of aggregated actions may include utilizing a lifecycle state machine that identifies a portion of the actions performed on a single ITSM record. Further, compressing may include identifying actions that affect the progression of a measurement of an elapsed-duration of time during which work may be performed on the ITSM record. For example, actions associated with updating an ITSM record with particular information and/or actions associated with reassigning an ITSM record to an ITSM resource may be actions that do not modify the SLT state associated with the ITSM record.

Compressing the portion of the plurality of aggregated actions may further include identifying actions of a plurality of actions performed over a single ITSM record during the same time unit that do not affect that SLT database table entry corresponding to the ITSM record except for the elapsed-duration calculation. For example, if an ITSM record has start, suspend, and unsuspend actions performed on it, the final SLT state for the update should be active since the final action prior to the update was an unsuspend action which rendered the ITSM record active. Therefore, compressing the portion of the plurality of actions performed over the single ITSM record may include compressing the three example actions into one action which will set the SLT state to be active. That is, the two actions start and suspend may be essentially ignored for the purposes of updating and SLT state, thereby reducing the consumption of computation resources to process the compressed actions as three separate actions.

The update module 230 may include CRI that when executed by the processing resource 222 may update, in a single operation at the predetermined elapsed time, SLT information of each of the plurality of ITSM records based on the compressed actions. Updating an ITSM record in a single operation at a predetermine elapsed time may include updating and/or modifying SLT information associated with a SLT database entry corresponding to the ITSM record. For example, updating the plurality ITSM record may include updating the SLT state associated with each of the SLT database entries corresponding to the plurality of ITSM records. The SLT state of an ITSM record may be updated based on the compressed portion of the aggregated plurality of actions performed on each of the ITSM records since a prior update of the SLT database. For example, the portion of the aggregated plurality of actions compressed for application to the SLT database entries in a single operation may include actions that modify the SLT state from active to inactive or inactive to active. These SLT state modifying actions may occur within a period of time (e.g., the predetermined elapsed time) between updates of the SLT database. In such examples, the SLT state stored in the SLT database associated with an SLT database entry corresponding to an ITSM may be modified in order to reflect the new SLT state.

Updating SLT information may include progressing an elapsed duration of each of the plurality of ITSM records. That is, a measurement of the elapsed duration of ITSM record activity associated with an SLT database entry corresponding to an ITSM record may be incrementally advanced in an update of the SLT database to reflect time elapsed since the prior SLT database update. The increment of progression of the elapsed duration of each of the plurality ITSM records may be based on a corresponding SLT state of each of the plurality of ITSM records. That is, the increment of progression of the elapsed duration may be an increment corresponding to the amount of time that elapsed since the prior SLT database update only during the portions of that period when the SLT state associated with an ITSM record was active. The portions of the period that correspond to an active SLT state may be determined based on the identification of the actions performed on the ITSM record that affect the SLT state and time stamps associated therewith. The identified actions may include those actions that were compressed and not executed as separate actions for the purposes of updating the SLT state of the ITSM record. The times stamps may define the start and end times of periods when the SLT state was active or inactive.

Additionally, the increment of progression of the elapsed duration may be based on a working schedule (e.g., a dedicated working occurrences table, etc.) for the ITSM resources assigned to the ITSM record. That is, the increment of progression of the elapsed duration may be an increment corresponding to the amount of time that elapsed since the prior SLT database update only during the portions of that period when the SLT state associated with an ITSM record was active and the working schedule of an ITSM resources assigned to the ITSM record was available to perform work on the ITSM record.

Updating SLT information may include updating a target date of each of the plurality of ITSM records. The target date may include the date and/or time by which the ITSM record should be resolved or otherwise completed. The target date may be based on a target duration specified in a SLA. Additionally, a target date may be based on an updated elapsed-duration of each of the plurality of the ITSM records. For example, a particular ITSM record may be associated with a target duration specified in an SLA specifying a maximum amount of time that is allotted to resolve the ITSM record and a target date may be determined and/or updated based on the total time remaining of the target duration minus the elapsed-duration. The target date may be modified by modifications of the corresponding ITSM record. For example, if a target-date is Thursday for an ITSM ticket opened on Wednesday based on the fact that the ITSM record is associated with a target definition allowing 24 hours for resolution, but that ITSM record experiences a 24 hour period of an inactive SLT state (e.g., an action such as a request to an end-user for more information regarding an underlying IT problem suspending the ITSM record for 24 hours) the target-date may be modified to Friday. The timestamps associated with actions, as described above, may be utilized to determine modifications to the target-date associated with a corresponding ITSM record.

Updating the target-date may include calculating a working period of an ITSM resource. Calculating a working period of an ITSM resource may include calculating a period of time during which an ITSM resource such as an IT service agent is available to perform work on ITSM records. Calculating the working period may include analyzing a working schedule of an ITSM resource such as, for example, analyzing iCalendar expressions defining a working schedule of an ITSM resource. For example, an IT service agent may utilize a calendar application that incorporates iCalendar computer files to define a working schedule as every weekday from 8 am to 5 pm. This general iCalendar expression may define a recurrence pattern of a working schedule. Calculating a working period may include analyzing these iCalendar expressions and identifying working schedules of ITSM records.

Updating the target-date may include creating a dedicated working-occurrences database table storing a working-occurrence associated with each of the plurality of ITSM records. Creating the dedicated working-occurrences database may include spanning the calculated working periods into a dedicated table in which specific dates and times during which an IT resource will be available for working on ITSM records. Such a dedicated working-occurrences table creates a unified shared table for all the varied working schedules of IT resources available.

As described above, the dedicated working-occurrences table may be utilized in determining and updating a target for each of the plurality of ITSM records. The working-occurrences table may be utilized in determining a date associated with a target duration. For example, a target duration may be twelve hours for resolution of an ITSM record opened on a Monday morning, but the IT resource assigned to resolving the ITSM record may be scheduled to work six hours on Monday and six hours of Friday. Accordingly, the target date may be determined utilizing the target duration and the working-occurrences table. In this example, the target date may be determined to be Friday evening since that is the date and time that twelve hours with an available assigned IT resources will have elapsed. Joint operations may be performed over the SLT database and the dedicated working-occurrences table in order to determining and update a target date.

Similarly, the elapsed-duration of an ITSM record may be determined based on the working-occurrences table. For example, an elapsed-duration of a particular ITSM record may include a duration of time elapsed with an active ITSM record during which an IT resource assigned to the ITSM record is scheduled to perform work according to a corresponding working-occurrence in a working-occurrences table. Joint operations may be performed over the SLT database and the dedicated working-occurrences table in order to determining and update an elapsed-duration.

Figure 3:
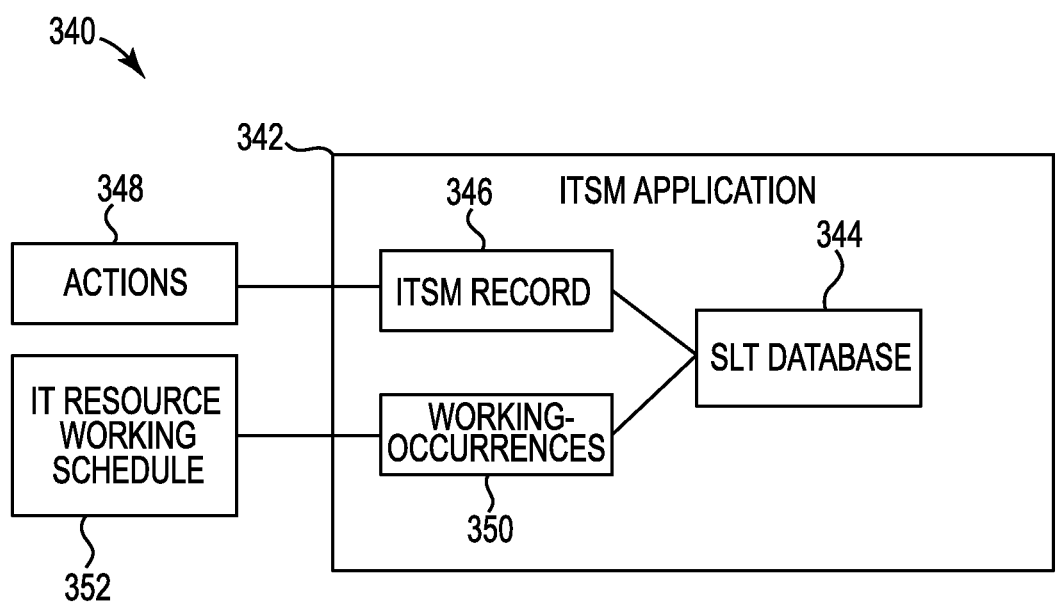
FIG. 3 illustrates an example of an environment for service level target tracking according to the present disclosure.

FIG. 3 illustrates an example environment 340 suitable for SLT tracking. The environment 340 is shown to include an ITSM application 342, an SLT database table 344, and ITSM record 346, actions 348, a working-occurrences database table 350, and an IT resource working schedule 352. The example environment 340 may be suitable for SLT tracking utilizing a system (e.g., system 100 as referenced in FIG. 1), a computing device (e.g., computing device 220 as referenced in FIG. 2), and a method (e.g., method 480 as referenced in FIG. 4).

The environment 340 may include an ITSM application 342. The ITSM application 342 may be an information technology service management platform that may manage services, application, and hardware across an IT environment. The ITSM application 342 may be a software as a service (SaaS) ITSM platform (e.g., delivered as a hosted cloud-based service over the Internet). The ITSM application 342 may include CRI that when executed by a processing resource may coordinate IT service requests and IT service resources to service the request across a managed IT environment.

The ITSM application 342 may coordinate IT service requests with IT resources to service the request by generating an ITSM record 346. An ITSM record 346 may include an electronic record of an IT service request and/or the work performed in resolving the underlying request. The ITSM record 346 may be used by the ITSM application 342 as a record of the application of IT resources to an IT service request. The ITSM application may manage a plurality of IT service requests and other IT incidents and each may be associated with an ITSM record 346. An ITSM record 346 may be assigned to a specific target definition. A target definition may include a target duration (e.g., how much time is allowed to elapse in supplying a resolution to the ITSM record 346) and an IT resource working schedule 352 assignment. Therefore, a specific ITSM record 346 may be assigned to a specific target duration and this assignment may define how much time is allowed to pass (and according to which IT resource working schedule 352) before a specific service must have been supplied for a submitter of the specific ITSM record 346. The assignment may be defined according to specific properties of the ITSM record 346. For example a priority associated with an ITSM record 346 may be utilized in determining a target definition assignment for the ITSM record 346. In an example, if a first ITSM record 346 has a high priority it may be assigned to a target definition defining that the first ITSM record 346 should be answered within a relatively short period of time (e.g., shorter target duration) than a second ITSM record having a lower priority. A change in the properties of the ITSM record 346, such as the priority may cause the target definition to be modified. For example, if the priority of an ITSM record 346 is increased then the target duration of the target definition may be decreased.

The ITSM application 342 may include an SLT database table 344. The SLT database table 344 may serve as a single database table of SLT information for each of a plurality of ITSM records 346 represented as individual SLT database entries. The SLT database table 344 may include a comprehensive set of values for each of the SLT database entries. For example, the SLT database table 344 may include an SLT state, a target-date, an elapsed-duration, and an SLT status associated with each SLT database entry corresponding to each of a plurality of ITSM records 346.

The ITSM application 342 may include a working-occurrences database table 350. A working-occurrences database table may exploit that working schedules 352 of a plurality of ITSM resources are a common shared resource among a plurality of ITSM records 346. That is, a working schedule 352 of each IT resource may be information that is common and/or universal within the ITSM application 342 since the pool of IT resources is a common pool from which the ITSM application 342 may draw to resolve an ITSM record 346 thereby rendering the working schedule 352 of an IT resource potentially applicable to every ITSM record 346 being managed. In this manner, two separate ITSM records 346 may utilize the same IT resource, therefore rendering the working schedule 352 of that IT resource applicable to both.

The working-occurrences database table 350 may be a single dedicated database table that houses working-occurrences (e.g., relevant working periods for an assigned IT resource) for each of a plurality of target definitions. A working-occurrence for each target definition may be determined based on a corresponding working schedule 352. The working schedule 352 may be defined using a scheduling policy and exceptions to this policy (e.g., policies extracted from iCalendar expressions). From the working schedules 352 working periods relevant to a particular target definition may be calculated for a range of time (e.g., a few days, a few months, etc.) in the future and the working periods may be spanned into the dedicated working-occurrences database table 350 as a working-occurrence for each of the plurality of target definitions. The working-occurrences database table 350 may, therefore, store periods of time when each of the plurality of IT resources are available to perform work within a target definition.

The SLT database table 344 may be updated in order to track performance of the ITSM application 342 against SLTs. That is, an IT service agent may track their respective SLTs realization such as responding to and resolving ITSM records 346 as defined in an SLA utilizing the information managed by the ITSM application 342 such as the SLT information stored within the SLT database table 344. The SLT information within the SLT database table 344 may be periodically updated. In contrast to computationally intensive event-based updating, the ITSM application 342 may update the SLT database table 344 within a predetermined frequency. That is, the SLT database table 344 may be updated upon a predetermined elapsed period of time (e.g., one minute). Upon the passage of the predetermined elapsed period of time a calculation cycle may be initiated, which updates the SLT database table 344.

The calculation cycle may include aggregating of each of a plurality of actions 348 performed over an ITSM record since the last calculation cycle. An action 348 may be a work event performed on the IT item associated with the ITSM record. The action 348 may refer to the physical action taken on the IT item and/or the record of a physical action taken on the IT item associated with the corresponding ITSM record 346. The action 348 may be a work event that denotes an interaction of an IT resource and/or an end user with the IT item. The action 348 may be an event that results in a modification of an IT item and/or the corresponding ITSM record 346.

In utilizing the predetermined elapsed duration cycle of updating and SLT database table 344 it may be the case that multiple actions 348 have been taken over multiple ITSM records 346 in the intervening time between calculation cycles. The ITSM application 342 may aggregate these actions 348. Aggregating the actions 348 may include identifying an SLT action type associated with each action 348. Aggregating the actions 348 may include grouping actions of the same type for performance of those actions 348 in a single bulk operation over the SLT database table 344. Performance of the actions 348 may include applying a change to an SLT database table entry resulting from an action 348 performed on a corresponding ITSM record 346 and/or the underlying IT item. For example, if one of the actions performed in the intervening period between calculation cycles was suspending work on an ITSM record 346, then a relevant SLT state row in the SLT database table 344 may be modified from active to inactive and a relevant SLT status row in the SLT database table 344 may be modified from active to suspended.

A compression mechanism may be utilized in order to compress different actions 348 performed over the same ITSM record 346 in the same intervening time between calculation cycles. For example, an ITSM record 346 may have actions 348 performed on it that lead to the ITSM record 346 being created, suspended, unsuspended, stopped, and/or restarted in the same intervening time between calculation cycles. Rather than performing each action 346 individually via individual SQL operations upon relevant rows of the SLT database table 344 into a corresponding SLT state and/or SLT state transition, multiple actions 346 and their corresponding SLT state transitions may be processed by a state machine and compressed into a single SQL operation to maintain an accurate SLT state. That is, in order to accurately handle multiple actions 348 that are taken over the same ITSM record 346 in the same time unit, a state machine may be defined which processes the given actions 348. Every state in the state machine may be equivalent to an SQL operation that will eventually be taken upon relevant rows in the SLT database table 344. Transitions between states may be defined by performed actions 348. A portion of the state transitions may represent a compression over actions (e.g., a portion of a plurality of performed actions 348 may be compressed into a single SQL operation) while keeping the correct SLT state and progressing an associated elapsed-duration correctly.

For example, during the lifecycle of an ITSM record 346 the state machine may identify actions 348 performed on the ITSM record 346 that may be compressed so that they will not affect the SLT state, regardless of the effect of the actions 348 on an elapsed-duration of the ITSM record 346. The compressed actions 348 may update the SLT database table 344 once according to the SLT state of an ITSM record 346 corresponding to an SLT database table entry. For example, the following plurality of actions 348 may be performed over an ITSM record 346 over a same time unit: an action 348 associated with creating the ITSM record 346, an action 348 associated with suspending the ITSM record 346, an action 348 associated with unsuspending the ITSM record 346. After performing these actions 348 the SLT state should be active (e.g., unsuspended), so the create action and the suspend actions do not affect the SLT state although they do affect the duration calculation. Therefore, the three actions may be compressed into one action which may result in updating the SLT state to active while progressing the ITSM record 346 accounting for all three actions.

The calculation cycle may include comprehensively progressing an elapsed-duration of each the ITSM records 346 and/or their corresponding SLT database table entries in a single bulk operation using a dedicated database query. Progressing an elapsed-duration may include tracking and/or determining a previous cycle time. A previous cycle time may be a time point when a previous calculation cycle and/or SLT database table 344 update. Progressing an elapsed-duration may include tracking and/or determining a current time. A current time may be a time point corresponding the time at which the calculation cycle is being executed.

Given the previous cycle time and the current time, the elapsed-duration may be progressed in the SLT database table 344 by an amount of time that has passed since the prior calculation cycle. However, the elapsed-duration may be progressed by only a portion of the time that has passed since the prior calculation cycle. That portion may be the portion corresponding to a working-occurrence in the working-occurrences database table 350 specifying when an assigned IT resource is scheduled to be performing work. For example, if time elapsed since the last calculation cycle is equal to one minute, but the working-occurrence of an assigned IT resource during that same time period was thirty seconds, then the elapsed-duration may be progressed by only thirty seconds.

Further, the portion of the time that has passed since the prior calculation cycle may include only those portions of time during which the ITSM record 346 was active (e.g., had an active SLT state, did not have a suspended, achieved, or failed SLT status). That is, the elapsed-duration may be progressed by the amount of time that it was active. Further, the elapsed-duration may be progressed by the amount of time that the ITSM record 346 was active and during which an assigned IT resource is scheduled to be performing work.

Since multiple actions 348 may be taken over multiple ITSM records in the intervening time between calculation cycles, an ITSM record 346 may oscillate between an active and inactive SLT states during this time. Since it may be desirable to progress the elapsed-duration of only active ITSM records 346, timestamps may be determined and/or associated with each action 348 in order to identify those portions of the intervening time between calculation cycles that correspond to when the ITSM record 346 had an active SLT state. For example, if an ITSM record 346 was created, started, and/or unsuspended in the middle (duration X) of the intervening time (duration Y) between calculation cycles then the corresponding elapsed-duration may be progressed by Y−X.

The actions 348 and the associated timestamps may be stored in SLT database table 344 prior to elapsed-duration update. In this manner, dedicated corresponding columns in this database table may be utilized to take into account actions 348 and their pre-calculated timestamps in updating an elapsed duration. To update the elapsed-duration a join may be performed between the SLT database table 344 and the occurrences table and rows corresponding to each SLT database entry may be located utilizing SQL range operators.

The elapsed-duration progression may be calculated utilizing the equation: (Current End Time−Current Start Time) of each action 348 in a predetermined elapsed-duration where the start and end times are defined using the following recursion formula:

Current Start Time$_n$ = $t_n - t_{n-1_{Current\ End\ Time}} + t_{n-1_{Current\ Start\ Time}}$ Current End Time$_n$ =

IF (last action is Stop or Suspend Action type) THEN action's timestamp ELSE $t_{n+1}$ Where $t_n$ represents the timestamp of action n, where $t_0$ may represent the windows start time and $t_{n+1}$ represents the window end time.

In an example, the following actions may be performed over an ITSM record 346 in a same time window corresponding to the time intervening two updates of the SLT database table 344: an action 348 associated with starting an ITSM record 346, an action 348 associated with suspending an ITSM record 346, and an action 348 associated with unsuspending the ITSM record 346. In such an example, each action 348 may have a timestamp. In this example, the timestamps may include timestamp $t_0$ corresponding to a timestamped start of a predetermined elapsed time, $t_1$ corresponding to a timestamped starting of the ITSM record 346, $t_2$ corresponding to a timestamped suspension of the ITSM record 346, $t_3$ corresponding to a timestamped unsuspending of the ITSM record 346, and $t_4$ corresponding to a timestamped end of a predetermined elapsed time. The elapsed-duration of the ITSM record 346 may be progressed during portions of the predetermined elapsed time when the corresponding SLT state is active. In this example the portions of the predetermined elapsed time when the SLT state was active may correspond to the time between the starting of the ITSM record 346 and the suspension of the ITSM record 346 in addition to the time between the unsuspension of the ITSM record 346 and the end of the predetermined elapsed time. According to the above described recursion formula, the start and end time of the portions of the predetermined elapsed time when the corresponding SLT state is active may be determined by the following equation:

$$\text{Current Start Time}_3 = t_3 - t_{2_{Current\ End\ Time}} + t_{2_{Current\ Start\ Time}}$$
$$= t_3 - (t_2) + (t_2 - t_2 + t_1)$$
$$= t_3 - t_2 + t_1$$

$$\text{Current End Time}_3 = t_4$$

The calculation cycle may also include calculating an updated SLT status of each of the ITSM records 346. The updated SLT status may be calculated by comparing an updated elapsed-duration and the target duration associated with each ITSM record 346 to determine whether the elapsed-duration has exceeded the time allotted in the target duration. This comparison may occur by directly comparing the rows of the SLT database entries corresponding to the target duration and the updated elapsed-duration of each ITSM record 346. Calculating the updated SLT status may include updating the SLT status of each of the ITSM records 346. Updating the SLT status of each of the ITSM records 346 may include modifying the SLT status associated with a corresponding SLT database table entry saved in the SLT database table 344. For example, a SLT database table entry may be updated to reflect a change in the SLT status of a corresponding ITSM record 346 between active, breached, achieved, and/or failed SLT status.

The calculation cycle may include calculating an updated target date of an ITSM record 346. An update target date may be calculated in a dedicated database query as a calculation in a single SQL operation over all the ITSM records 346. The target date may change following various actions 348 performed on the ITSM record 346. For example, an action 348 that starts or unsuspends an ITSM record 346 may lead to progression of the elapsed-duration and depletion of the time remaining in the target duration. In another example, an action 348 that suspends an ITSM record 346 may pause the elapsed-duration and/or the depletion of the time remaining in the target duration, but may progress the end target date by the amount of time during which the ITSM record 346 is suspended. Additionally, the target date may be modified following a change in the target duration and or working schedule 352 of the target definition assigned to the ITSM record 346. The updated target date may be calculated based on action timestamps of actions 348 performed on the ITSM record 346, the elapsed-duration of the ITSM record 346 so far, the target duration and an assigned IT resource working schedule 352. For example, the target date may be the date corresponding to the total remaining target duration (target duration−elapsed-duration) as elapsed over an assigned resource working schedule 352.

An example calculation of an updated target date for a single ITSM record 346 may include calculating in a memory resource (not shown) the working occurrences throughout a life cycle of the ITSM record 346. In contrast to the computationally intensive method of determining updated target dates over each of the ITSM records 346 separately, the ITSM application 342 may exploit the fact that a plurality of IT resource working schedules 352 are shared among a plurality of distinct ITSM records 346 and utilize the working-occurrences database table 350 in determining the updated target date for all the ITSM records 346 in a single SQL operation. For example, a dedicated query may perform a join between the SLT database table 344 and the working-occurrences database table 350 while locating relevant actions timestamps in SLT database table 344. The joined rows of working-occurrences database table 350 may then be aggregated from that point until the elapsed-duration reached the required duration. This method may supply the updated target date for all the ITSM records 346 in the SLT database table 344 in a single SQL operation.

The calculation cycle may include detecting ITSM records 346 that reach a predefined threshold and/or set of thresholds in another dedicated database query. Detecting threshold reaching may be utilized to actively track SLT progress. Further, detecting threshold reaching may be incorporated into monitoring, modifying, and generating communications regarding an ITSM record 346 lifecycle. For example, an end user associated with an ITSM record 346 may request that he will receive a notification when fifty percent of the target duration for the ITSM record 346 has been consumed. An end user associated with an ITSM record 346 may also request to edit attributes of the ITSM record 346 following reaching a specific threshold. In contrast to the computationally intensive single-record-based method of managing threshold reaching, a single bulk operation may be utilized to detect threshold reaching of a plurality of ITSM records 346 and manage any events triggered there from.

Detecting ITSM records 346 that reach a predefined threshold may include tracking a consumed percentage of various ITSM records 346 over their corresponding target durations and utilizing timers to detect when a single ITSM record 346 reaches a threshold. Detecting ITSM records 346 in this manner may be triggered simply by time going by rather than by actions performed over the ITSM records 346. The ITSM application 342 may exploit the above-described background process that updates the elapsed-duration of all ITSM records 346 in a predetermined temporal frequency to detect threshold reaching. That is, given the updated elapsed-duration and the target duration of an ITSM record 346, the consumed percentage of the target duration may be extracted in a dedicated column of the SLT database table 344. In a dedicated column of the SLT database table 344 a prior consumed percentage of the target duration may be stored at the beginning of a cycle and then a join may be performed between a predefined table of thresholds (not shown) to find the rows of the SLT database table 344 in which the previous percentage is smaller than a given threshold value and the new percentage is larger than this threshold. The results may be outputted to the end user utilizing an event-triggered mechanism.

The calculation cycle may further include updating target definitions of multiple ITSM records 346 that have been modified in the intervening time between calculation cycles. Occasionally, a contract (e.g., SLA) under which the ITSM application 342 coordinates the supply of IT services to end users may be modified. A resulting change to a target definition may be captured and may cause a corresponding modification to an SLT status and/or a target date of an associated active ITSM record 346. The SLT database table 344 may be updated following modifications to the target definitions. The modifications of the target definitions resulting from contract changes may be aggregated. For example, a background process may be performed in a predetermined temporal frequency which compares previous and current target definitions and marks in the SLT database table 344 the definitions that have been updated since the last calculation cycle. Applying the changes over the SLT database table 344 may then be performed wising a dedicated database query, which recalculated the SLT status and target date for each of the ITSM records 346.

Figure 4:
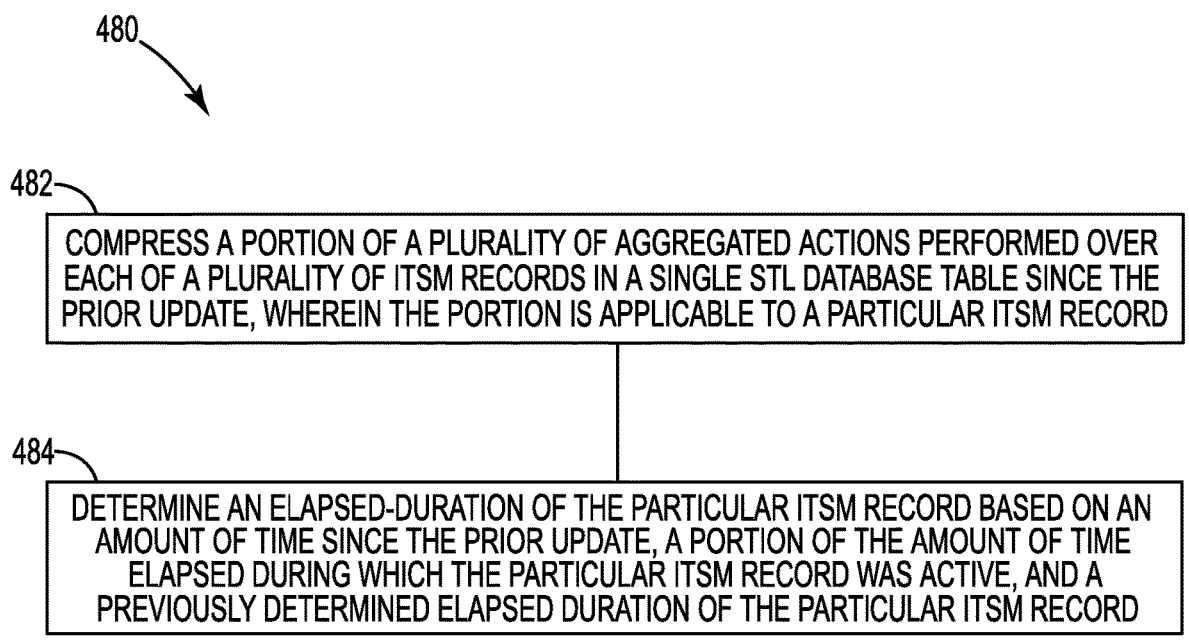
FIG. 4 illustrates a flow chart of an example of a method of service level target tracking according to the present disclosure.

FIG. 4 illustrates a flow chart of an example of a method 480 of SLT tracking. In some examples, the method 480 may be performed utilizing a system (e.g., system 100 as referenced in FIG. 1) and/or a computing device (e.g., computing device 220 as referenced in FIG. 2).

As illustrated at 482, the method 480 may include compressing, in a single operation at a predetermined elapsed time since a prior update, a portion of a plurality of aggregated actions performed over each of a plurality of ITSM records in a single SLT database table since the prior update of the SLT database table. The compressed portion may include a portion that is applicable to (e.g., performed on) a particular ITSM record of a plurality of ITSM records. Therefore, the compressed actions may be applicable to SLT database table entries corresponding to the particular ITSM record for the purposes of updating.

As illustrated at 484, the method 480 may include determining an elapsed-duration of the particular ITSM record based on an amount of time elapsed since the prior update, a portion of the amount of time elapsed during which the particular ITSM record was active, and a previously determined elapsed-duration of the particular ITSM record. The portion of the amount of time elapsed during which the particular ITSM record was active may be determined based on a timestamp associated with each action of the portion of the plurality of aggregated actions. The method 480 may further include modifying an SLT state associated with the particular ITSM record according to a most recent action of the portion of the plurality of aggregated actions associated therewith. For example if an ITSM record had many actions performed over it during a predetermined elapsed time period that would have modified the SLT state back and forth between active and inactive, but a final action occurring before the update was an unsuspend action rendering the ITSM record active then the SLT state may be modified to active according to that most recent action.

As used herein, "logic" is a processing resource to perform a particular action and/or operation, etc., described herein, which includes hardware, e.g., various forms of transistor logic, application specific integrated circuits (ASICs), etc., as opposed to computer executable instructions, e.g., software or firmware, etc., stored in memory and executable by a processor. Further, as used herein, "a" or "a number of" something may refer to one or more such things. For example, "a number of widgets" may refer to one or more widgets.

The figures herein follow a numbering convention in which the first digit or digits correspond to the drawing figure number and the remaining digits identify an element or component in the drawing. As will be appreciated, elements shown in the various examples herein may be added, exchanged, and/or eliminated so as to provide a number of additional examples of the present disclosure. In addition, as will be appreciated, the proportion and the relative scale of the elements provided in the figures are intended to illustrate certain examples of the present disclosure, and should not be taken in a limiting sense.

The above specification, examples and data provide a description of the method and applications, and use of the system and method of the present disclosure. Since many examples may be made without departing from the spirit and scope of the system and method of the present disclosure, this specification merely sets forth some of the many possible example configurations and implementations.

What is claimed is:

1. A system for service level target (SLT) tracking comprising:
    a processor; and
    a non-transitory storage medium comprising instructions executable by the processor to:
    aggregate, at a predetermined elapsed time since a prior update of an SLT database table comprising a plurality of entries, a plurality of actions performed on a plurality of information technology service management (ITSM) records since the prior update of the SLT database table, each entry of the SLT database table comprising a first field to indicate a SLT state associated with a unique ITSM record, wherein each ITSM record is an electronic ticket created in response to a unique request to perform an information technology (IT) service task, wherein the plurality of ITSM records are distinct from the SLT database table, wherein at least two actions of the plurality of actions are dissimilar and each of the plurality of actions have a common outcome, and within the aggregated plurality of actions, the at least two dissimilar actions are each translated into a single action type that characterizes actions having the common outcome;
    identify a portion of the aggregated plurality of actions, the identified portion comprising multiple actions that previously updated a first ITSM record of the plurality of ITSM records since the prior update of the SLT database table;
    determine, using a state machine comprising a plurality of SLT states, an updated SLT state associated with the first ITSM record based on the multiple actions that previously updated the first ITSM record;
    determine a single database operation to be performed in a first entry in the SLT database table based on the updated SLT state, wherein the first entry in the SLT database table is associated with the first ITSM record; and
    perform the single database operation to update the first entry in the SLT database table to indicate the updated SLT state associated with the first ITSM record.

2. The system of claim 1, wherein the state machine defines transitions between the plurality of SLT states based on at least some of the plurality of actions performed on the plurality of ITSM records.

3. The system of claim 1, wherein the identified portion of the aggregated plurality of actions includes a create action that generated the first ITSM record.

4. The system of claim 1, wherein the identified portion of the aggregated plurality of actions includes a start action that initiated a measurement of an elapsed-duration of work on the first ITSM record.

5. The system of claim 1, wherein the identified portion of the aggregated plurality of actions includes a stop action that stopped a measurement of an elapsed-duration of work on the first ITSM record.

6. The system of claim 1, wherein the identified portion of the aggregated plurality of actions includes a suspend action that suspended a measurement of an elapsed-duration of work on the first ITSM record.

7. The system of claim 6, wherein the identified portion of the aggregated plurality of actions includes an unsuspended action that resumed the measurement of the elapsed-duration of the work on the first ITSM record.

8. The system of claim 1, wherein the identified portion of the aggregated plurality of actions includes a restart action that reinitiates a measurement of an elapsed-duration of work on the first ITSM record from a zero time measurement.

9. A non-transitory computer readable medium storing instructions executable by a processing resource to:
    identify, at a predetermined elapsed time since a prior update of a service level target (SLT) database table comprising a plurality of entries, a portion of a plurality of aggregated actions performed on a plurality of information technology service management (ITSM) records since the prior update of the SLT database table, wherein the identified portion of the plurality of aggregated actions comprises multiple actions that previously updated a first ITSM record of the plurality of ITSM records since the prior update of the SLT database table, each entry of the SLT database table comprising a first field to indicate a SLT state associated with a unique ITSM record, wherein each ITSM record is an electronic ticket created in response to a unique request to perform an information technology (IT) service task, wherein the plurality of ITSM records are distinct from the SLT database table, wherein at least two actions of the plurality of aggregated actions are dissimilar and each of the plurality of aggregated actions have a common outcome, and within the plurality of aggregated actions, the at least two dissimilar actions are each translated into a single action type that characterizes actions having the common outcome;
    determine, using a state machine comprising a plurality of SLT states, an updated SLT state associated with the first ITSM record based on the multiple actions that previously updated the first ITSM record;
    determine a single database operation to be performed in a first entry in the SLT database table based on the updated SLT state, wherein the first entry 1s associated with the first ITSM record; and perform the single database operation to update the first entry in the SLT database table to indicate the updated SLT state associated with the first ITSM record.

10. The non-transitory computer readable medium of claim 9, wherein the state machine defines transitions between the plurality of SLT states based on at least some of the plurality of aggregated actions performed on the plurality of ITSM records.

11. The non-transitory computer readable medium of claim 9, wherein the identified portion of the plurality of aggregated actions includes a stop action that stopped a measurement of an elapsed-duration of work on the first ITSM record.

12. The non-transitory computer readable medium of claim 11, wherein the identified portion of the plurality of aggregated actions includes an unsuspend action that resumed the measurement of the elapsed-duration of the work on the first ITSM record.

13. The non-transitory computer readable medium of claim 9, wherein the single database operation updates an elapsed duration period specified in the first entry of the SLT database table.

14. A method for service level target (SLT) tracking comprising:
aggregating, at a predetermined elapsed time since a prior update of an SLT database table comprising a plurality of entries, a plurality of actions performed on a plurality of information technology service management (ITSM) records since the prior update of the SLT database table, each entry of the SLT database comprising a first field to indicate a SLT state associated with a unique ITSM record, wherein each ITSM record is an electronic ticket created in response to a unique request to perform an information technology (IT) service task, wherein the plurality of ITSM records are distinct from the SLT database table, wherein at least two actions of the plurality of actions are dissimilar and each of the plurality of actions have a common outcome, and within the aggregated plurality of actions the at least two dissimilar actions are each translated into a single action type that characterizes actions having the common outcome;
identifying a portion of the aggregated plurality of actions, the identified portion of the aggregated plurality of actions comprising multiple actions that previously updated a first ITSM record of the plurality of ITSM records since the prior update of the SLT database table;
determining, using a state machine comprising a plurality of SLT states, an updated SLT state associated with the first ITSM record based on the multiple actions that previously updated the first ITSM record;
determining a single database operation to be performed in a first entry in the SLT database table based on the updated SLT state, wherein the first entry in the SLT database table is associated with the first ITSM record; and
performing the single database operation to update the first entry in the SLT database table to indicate the updated SLT state associated with the first ITSM record.

15. The method of claim 14, wherein performing the single database operation updates an elapsed duration period specified in the first entry of the SLT database table.

16. The method of claim 15, wherein performing the single database operation updates a target duration period specified in the first entry of the SLT database table.

17. The method of claim 14, wherein a single database command is composed in a database query language.

18. The method of claim 17, wherein the state machine defines transitions between the plurality of SLT states based on at least some of the plurality of actions performed on the plurality of ITSM records.

19. The system of claim 1, wherein the single database operation updates an elapsed duration period specified in the first entry of the SLT database table.

20. The system of claim 1, wherein the single database operation updates a target duration period specified in the first entry of the SLT database table.

* * * * *